United States Patent [19]

Cziptschirsch et al.

[11] 4,417,761
[45] Nov. 29, 1983

[54] SWIVEL BEARING PROTECTIVE HOUSING FOR AUTOMOTIVE SUN VISOR

[75] Inventors: Kurt Cziptschirsch, Wuppertal; Lothar Viertel, Saarlouis; Peter Kaiser, Wermelskirchen, all of Fed. Rep. of Germany

[73] Assignee: Gebr. Happich GmbH, Fed. Rep. of Germany

[21] Appl. No.: 226,684

[22] Filed: Jan. 21, 1981

[30] Foreign Application Priority Data

Feb. 16, 1980 [DE] Fed. Rep. of Germany ....... 3005824

[51] Int. Cl.³ .............................................. B60J 3/02
[52] U.S. Cl. ................................................. 296/97 H
[58] Field of Search ................. 296/97 H, 97 J, 97 K, 296/189; 280/777; 70/72

[56] References Cited

U.S. PATENT DOCUMENTS 3,405,969 10/1968 Creel ................................. 296/97 H
3,827,748 8/1974 Herr ................................. 296/97 H

FOREIGN PATENT DOCUMENTS 1214327 12/1970 United Kingdom ............ 296/97 H

Primary Examiner—Robert R. Song
Assistant Examiner—Dennis Pedder
Attorney, Agent, or Firm—Ostrolenk, Faber, Gerb & Soffen

[57] ABSTRACT

The invention concerns the swivel bearing of a sun visor for an automotive vehicle. The swivel bearing connects the body of the sun visor with a mounting shaft for the sun visor. A protective housing comprised of injection molded plastic surrounds the swivel bearing housing. The protective housing is a single piece comprised of two halves which are hinged together along one edge and are clipped together at their opposite edge to surround the swivel bearing housing. The exterior of the protective housing is profiled so that all edges, corners and any other deformed part thereof has an outer contour radius of at least 3.2 mm. for eliminating sharp edges at the swivel bearing. The protective housing has an interior contour adapted to the outer contour of the swivel bearing housing.

4 Claims, 7 Drawing Figures

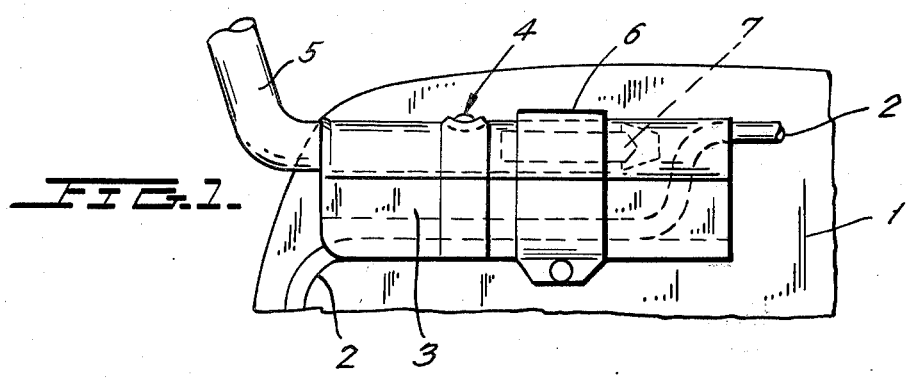
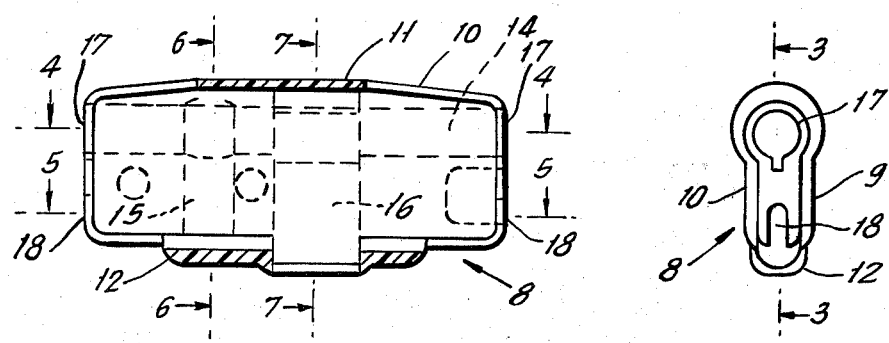
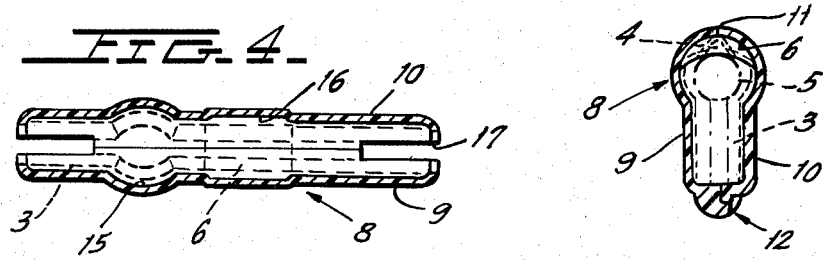
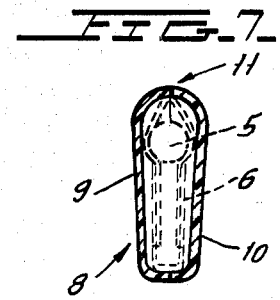

SWIVEL BEARING PROTECTIVE HOUSING FOR AUTOMOTIVE SUN VISOR

BACKGROUND OF THE INVENTION

The present invention relates to a sun visor for automotive vehicles and particularly to such a sun visor having a cushioned sun visor body which encloses a reinforcement frame. More particularly, the invention relates to a swivel-bearing housing which is fastened to the reinforcement frame and receives a mounting shaft.

Such sun visors are known. See, for instance, German Utility Model (Gebrauchsmuster) No. 1 841 742 and U.S. Pat. No. 4,174,864. Known sun visors of this type no longer satisfy the safety requirements published in Official Gazette No. L 206/26 of the European Communities of July 29, 1978. In sun visors of this type, the swivel bearing housing is generally formed of steel plate. This housing is the critical part since it can be the reason why a sun visor does not satisfy safety Guideline 74/60/EEC, in the version of May 19, 1978. Both at the ends and at the lower termination of a steel plate swivel bearing housing, the housing has relatively sharp edges which could pass through the cushioning of the sun visor body in the event of an accident in which a passenger strikes his head against the body of the sun visor, resulting in injuries.

SUMMARY OF THE INVENTION

Accordingly, it is the object of the present invention to improve the safety of a sun visor and in particular to prevent the swivel bearing housing from representing a source of injury.

In accordance with the invention, this object is achieved by a protective housing which surrounds the swivel bearing housing. The exterior of the protective housing is profiled so that every edge, corner and any other deformed part thereof is gradually curved to have an outer contour radius of at least 3.2 mm. The protective housing is developed as an injection molded part of plastic.

The object of the invention is realized simply and inexpensively by the invention since the usual structural construction of the sun visors can be fully retained. This permits existing manufacturing equipment such as tools to still be used, which represent a considerable investment. The protective housing scarcely increases the expense since it is produced at relatively low cost as a mass-produced article, and only a small amount of material is used in producing the protective housing. On the other hand, the protective housing enables the sun visor to satisfy safety requirements since the sharp edges of the swivel bearing housing can now no longer penetrate through the cushioning of the sun visor body.

The protective housing preferably is a single-piece, which simplifies its installation. It may be advantageous for the protective housing to consist of two halves, which are connected with each other by a film-like or thin hinge and the housing halves can be held against each other with inclusion of the swivel bearing housing by integral clip elements. The protective housing can thus be delivered in an extended condition and can be simply and rapidly installed by merely closing the halves over the swivel bearing housing and pressing its halves together, which can be readily done by hand.

As a further feature of the invention, the cross section of the opening of the protective housing can be profiled, at least extensively, to the outer contour of the swivel bearing housing. The protective housing will seat on the swivel bearing housing without play, and due to the inner support provided by the swivel bearing housing, the protective housing can be made with relatively thin walls. Experiments carried out on sun visors have shown that the safety requirements are fully met if the swivel bearing housing is covered by a protective housing which is made from polypropylene and which has a constant wall thickness of about 1.2 mm.

Other objects and features of the invention will be explained in further detail below with reference to the accompanying drawings.

BRIEF DESCRIPTION OF THE DRAWINGS

FIG. 1 is a section through a fragment of a sun visor body in the region of its swivel bearing;

FIG. 2 is an end view of the protective housing which surrounds the swivel bearing housing;

FIG. 3 is a section along the line III—III of FIG. 2;

FIG. 4 is a section along the line IV—IV of FIG. 3;

FIG. 5 is a section along the line V—V of FIG. 3;

FIG. 6 is a section along the line VI—VI of FIG. 3; and

FIG. 7 is a section along the line VII—VII of FIG. 3.

DESCRIPTION OF A PREFERRED EMBODIMENT

FIG. 1 shows a fragment of a cushioned, e.g. foamed plastic, sun visor body 1. A reinforcement frame 2 of wire is incorporated, e.g. by being embedded, in the body. The body has a swivel-bearing housing 3 embedded in it at a corner thereof. The housing 3 is attached to the frame 2. The housing 3 also supports a mounting shaft 5. On the swivel bearing housing 3, there are safety means 4 which comprise an opening that receives a projection on the shaft 5 and thereby prevents the sun visor body 1 from being removed from the shaft 5. Furthermore, a U-shaped spring 6, arranged on the swivel bearing housing 3, cooperates with flats 7 on the mounting shaft 5 to define detented swivel positions for the sun visor body 1.

The swivel bearing housing 3 is formed from a sheet metal blank that is folded to be substantially of U shape. It has a generally rectangular profile in the plane of the sun visor body. The swivel bearing housing 3 is fastened at its legs to the reinforcement frame 2 and also receives the mounting shaft 5 between its legs.

The swivel bearing housing 3 is completely surrounded by a protective housing 8 which also surrounds the safety means 4 and the spring 6 and thus covers practically the entire swivel bearing. Corresponding to the swivel bearing housing it surrounds, the protective housing has a generally rectangular profile. The protective housing 8 is formed of injection-molded plastic. All bends at the top and bottom edges, at both side edges and at all corners and any other deformed areas on the surface of the protective housing, on both the front and back of the housing 8, are gradually rounded, as can be seen from FIGS. 2–7. Every curve on the exterior of the housing 8 is shaped to have an outer contour radius of at least 3.2 mm. The protective housing 8, as can be noted particularly from FIGS. 6 and 7, consists of two halves 9 and 10, which are connected with each other at their head end or mounting shaft end to define a single piece. The connection is by a film-like hinge 11 of the same material as the halves 9 and 10 and integrated with them, but of much smaller thickness and thus quite flexible. At the foot end of the housing 8, cooperating clip elements 12, e.g. snap together clips, are formed on both halves of the protective housing 8. They hold the halves 9 and 10 together when the halves have been pressed against each other and the clip elements 12 have thereby been brought into engagement with each other.

Upon manufacture, the protective housing 8 is preferably produced in extended, unfolded form. Upon installation, it then need merely be wrapped over the swivel bearing housing 3 and pressed together in order to engage the clip elements 12.

As shown in FIGS. 3 to 7, the cross section of the internal opening of the protective housing 8 is substantially adapted to the outer contour of the swivel bearing housing 3, including recess 14 for shaft 5, recess 15 for safety means 4 and recess 16 for spring 6. The generally enclosed housing also has recesses 17 and 18 at its ends which respectively serve for the passage of the mounting shaft 5 and of the wire of the reinforcing frame 2. In FIGS. 3 to 7, the swivel bearing housing 3 together with the components connected therewith within the protective housing 8 is indicated in dashed line.

Although the present invention has been described in connection with a preferred embodiment thereof, many variations and modifications will now become apparent to those skilled in the art. It is preferred, therefore, that the invention be limited not by the specific disclosure herein, but only by the appended claims.

What is claimed is:

1. A sun visor for automotive vehicles, or the like, including a sun visor body, a mounting shaft for connecting the sun visor body to the body of a vehicle and a swivel bearing housing which is attached to the sun visor body and which is adapted to swivelably receive the mounting shaft, whereby the sun visor body may swivel around the mounting shaft at the swivel bearing housing;

a protective housing surrounding the swivel bearing housing for preventing access to the swivel bearing housing from the exterior of the protective housing; the protective housing having edges around the sides thereof, having corners joining the edges and having opposite sides at the opposite sides of the swivel bearing housing which sides are joined together at the edges; all of the edges, the corners between the edges and contoured areas on the exterior of the protective housing, being gradually curved to have an outer contour radius sufficiently large so as not to present any sharp edges; the swivel bearing housing has an exterior contour and the protective housing has an interior contour when it is surrounding the swivel bearing housing that is at least substantially the same as the outer contour of the swivel bearing housing.

2. The sun visor of claim 1, wherein the outer contour radius of all of the curves is at least 3.2 mm.

3. A sun visor for automotive vehicles, or the like, including a sun visor body, a mounting shaft for connecting the sun visor body to the body of a vehicle and a swivel bearing housing which is attached to the sun visor body and which is adapted to swivelably receive the mounting shaft, whereby the sun visor body may swivel around the mounting shaft at the swivel bearing housing;

a protective housing surrounding the swivel bearing housing for preventing access to the swivel bearing housing from the exterior of the protective housing; the protective housing having edges around the sides thereof, having corners joining the edges and having opposite sides at the opposite sides of the swivel bearing housing which sides are joined together at the edges; all of the edges, the corners between the edges and contoured areas on the exterior of the protective housing, being gradually curved to have an outer contour radius sufficiently large so as not to present any sharp edges;

the sun visor body is comprised of cushioned material and the swivel bearing housing and protective housing are embedded within that material;

a reinforcement frame embedded within the cushioned sun visor body; and a swivel bearing housing being fastened to the reinforcement frame, thereby to move together with that frame.

4. The sun visor of claim 3, wherein the outer contour radius of all of the curves is at least 3.2 mm.

* * * * *